United States Patent [19]

Keffeler

[11] 4,176,457
[45] Dec. 4, 1979

[54] COMBINED DIPSTICK BREATHER TUBE

[75] Inventor: Gary L. Keffeler, Lacon, Ill.

[73] Assignee: Caterpillar Tractor Co., Peoria, Ill.

[21] Appl. No.: 4,795

[22] Filed: Dec. 18, 1978

[51] Int. Cl.² ............................................. G01F 23/04
[52] U.S. Cl. ............................................... 33/126.7 R
[58] Field of Search .................... 33/126.4 R, 126.7 R

[56]  References Cited
U.S. PATENT DOCUMENTS

| 1,560,461 | 11/1925 | Barnes | 33/126.4 R |
| 3,738,176 | 6/1973 | Kerfoot | 33/126.4 R X |

Primary Examiner—Charles E. Phillips
Attorney, Agent, or Firm—Wegner, Stellman, McCord, Wiles & Wood

[57] ABSTRACT

A combined dipstick-breather tube device (13) for use in measuring the level of a body of liquid (L) in a housing (11) wherein turbulence may occur in the liquid making it difficult to make an accurate reading of the level thereof by conventional dipstick devices. The device (13) includes an outer dipstick tube (14) having a vent opening (22) adjacent its upper end above the level of liquid in the housing. The dipstick (18) extends downwardly through the tube (14) and further through a tubular guide (26) which serves as a baffle for preventing impingement of liquid passed inwardly through opening (22) against the dipstick so as to avoid erroneous level readings. The baffle (26) may be defined by a tubular element having integrally formed spacers (28,29) extending outwardly therefrom into engagement with the dipstick tube wall. The upper spacers 28 provide for flow of gaseous fluids between the upper end (23) of the dipstick tube and the opening (22) and the lower spacer (29) provides for a liquid passage (30) to return liquid back to the body thereof in the lower portion of the housing (11) as a result of such liquid passing inwardly through the vent opening 22. The dipstick may be provided with a conventional breather cap (25).

12 Claims, 3 Drawing Figures

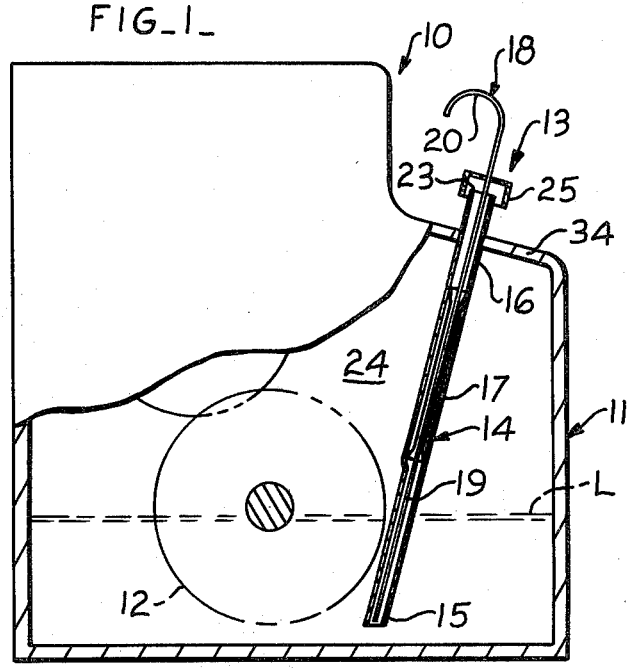
FIG_1_
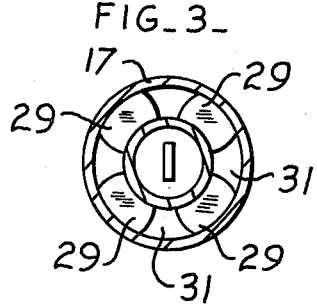
FIG_3_
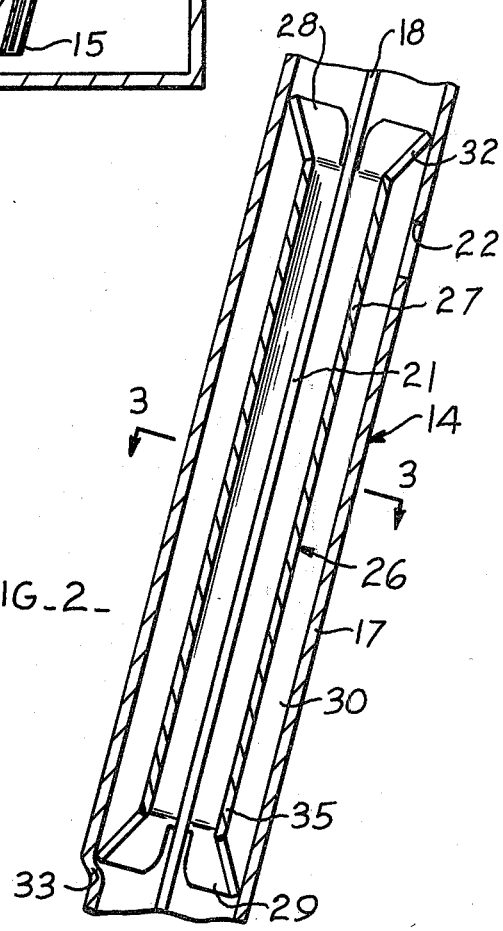
FIG_2_

COMBINED DIPSTICK BREATHER TUBE

COMBINED DIPSTICK BREATHER TUBE

Technical Field

This invention relates to dipstick devices and in particular to a combined dipstick breather tube device.

Background Art

It is conventional in vehicles and the like having crankcases or other housings holding liquid, such as lubricating oil, to provide a dipstick means for use in measuring the level of the liquid or oil in the housing. It is further conventional in connection with such dipstick means to utilize a support tube through which the removable dipstick is inserted to have its lower end extend downwardly into the body of oil or liquid, thereby to provide an indication of the level of the oil or liquid in the housing. Such structure is utilized to prevent turbulence of the liquid from providing an erroneous reading of the level by effectively preventing such turbulence from splashing or otherwise affecting the level of the liquid at the dipstick.

In certain forms of dipstick devices, the dipstick tube is further arranged to define a breather device. However, where the dipstick tube is so used, the lower end of the tube cannot be disposed below the normal level of the liquid within the housing, otherwise the breather action is prevented. Where the tube is permitted to be disposed normally above the level of the liquid, a portion of the dipstick is therefore exposed to the turbulent movement of the liquid and erratic or erroneous readings are obtained.

Disclosure of Invention

The present invention comprehends an improved device having means for measuring the level of liquid in a housing notwithstanding turbulence of the liquid therein and further defining breather means for passing gaseous fluids into and from the housing above the level of the liquid therein.

More specifically, the invention comprehends providing such a device wherein a vent opening is provided in the dipstick tube above the level of the liquid in the housing. The tube is preselected to have its lower end disposed within the body of liquid so that the dipstick extending downwardly through the tube is prevented from having the turbulently moving and splashing liquid from impinging thereon so as to effectively assure an accurate reading of the liquid level in the housing.

To prevent liquid passed inwardly through the vent opening from impinging on the dipstick within the dipstick tube, a baffle is provided therein inwardly of the vent opening. The baffle is arranged to define with the dipstick tube a gaseous fluid flow passage between the open upper end of the dipstick tube and the vent opening so as to permit the desired breather action of the device. The baffle preventing the impingement of liquid passed through the vent opening onto the dipstick is further arranged to conduct that liquid back to the lower end of the tube and into the body of liquid in the housing.

In the illustrated embodiment, the baffle defines a tubular element. The tubular element extends downwardly within the dipstick tube to adjacent the level of the liquid in the housing so as to prevent impingement of the liquid passed inwardly through the vent opening onto any portion of the dipstick above the level of the liquid in the housing being measured.

In the illustrated embodiment, the tubular element is centered coaxially within the dipstick tube by spacer means. In the illustrated embodiment, the spacer means comprise deformed portions of the baffle tubular element projecting outwardly into engagement with the dipstick tube wall.

Means may be provided for limiting the insertion of the baffle tube within the dipstick tube, and in the illustrated embodiment, comprise annular shoulder means on the dipstick tube engaged by the lower spacing means of the baffle tubular element.

The combined dipstick breather tube device of the present invention is extremely simple and economical of construction while yet providing the highly desirable features discussed above.

BRIEF DESCRIPTION OF THE DRAWING

FIG. 1 is a fragmentary elevation of an apparatus including a housing containing a body of liquid and an improved combined dipstick-breather tube device embodying the invention for selectively determining the level of the liquid in the housing;

FIG. 2 is a fragmentary enlarged diametric section of the combined dipstick-breather tube device; and FIG. 3 is a transverse section taken substantially along the line 3—3 of FIG. 2.

BEST MODE FOR CARRYING OUT THE INVENTION

In the illustrative embodiment of the invention as disclosed in the drawing, an apparatus generally designated 10 includes a housing 11 for holding a body of liquid L. Turbulence may be effected in the liquid by virtue of moving elements 12, such as gears, etc. Notwithstanding such turbulence, it is desirable to accurately measure the level of the liquid L at times.

The present invention comprehends an improved combined dipstick-breather tube device generally designated 13 for effecting such measurement and acting as a breather for the housing 11.

More specifically, device 13 includes a dipstick tube 14 having a first, lower end portion 15 extending downwardly into the liquid L, an upper end portion 16 projecting upwardly through a portion 34 of the housing 11, and a midportion 17 disposed within the housing above the level of the level L.

A dipstick generally designated 18 defines a lower end portion 19 received within the lower end portion 15 of the dipstick tube 14 so as to extend to below the upper level of the liquid L in the housing 11. The upper end 20 of the dipstick defines a manipulating portion for facilitated movement of the dipstick into and outwardly from the dipstick tube, as desired. The dipstick further defines a midportion 21 disposed within the midportion 17 of the dipstick tube when the dipstick is installed in its normal inserted disposition within the dipstick tube, as shown in FIGS. 1 and 2.

To permit the dipstick tube 14 to further serve as a breather tube, a vent opening 22 is provided in dipstick tube midportion 17 so as to cooperate with the upper open end 23 of the dipstick tube 14 in defining a gaseous fluid flow passage communicating between the ambient atmosphere exteriorly of the housing 11 and the space 24 within housing 11 above the level of liquid L therein. Thus, tube 14 may serve as a breather tube for passing air inwardly into the space 24 and vapors outwardly therefrom, as may occur in the normal operation of the apparatus 10.

As shown in FIG. 1, the dipstick may include a breather cap 25 carried on its outer end portion 20 overlying but spaced from the upper end 23 of the breather tube in the conventional manner.

The invention comprehends providing means within dipstick tube 14 for preventing impingement of liquid which may inadvertently pass inwardly through vent opening 22 against the dipstick 18, or more specifically, against the dipstick portion 21 inwardly of the opening 22 and extending downwardly therefrom to the upper level of the liquid L.

In the illustrated embodiment, the means for preventing such impingement comprises a baffle generally designated 26 having a portion 27 disposed inwardly of the vent opening 22. As shown in FIG. 2, the baffle extends downwardly from the level of the vent opening 22 to adjacent the upper level of the liquid L. In the illustrated embodiment, the baffle comprises a tubular element which is positioned longitudinally coaxially within the dipstick tube 14. More specifically, spacer means generally designated 28 may be provided at the upper end of the baffle tube above the level of opening 22 to center that end of the tube in the dipstick tube 14. The lower end of the baffle tube may be centered within the dipstick tube by lower spacer means 29. Thus, the spacer means 28 and 29 cooperate to center the entire baffle tube within the dipstick tube so as to define an annular liquid flow passage 30 therebetween.

As shown in FIG. 3, the spacer means 29 comprise integral portions of the lower end of the baffle tube projecting outwardly therefrom into engagement with the wall 17 defining the midportion of the dipstick tube. The spacer means 29 are annularly spaced to define therebetween a plurality of openings 31.

Thus, any liquid which inadvertently passes through the vent opening 22 to within the dipstick tube 14 is prevented from impinging on the dipstick 18 and instead is caused to flow downwardly through space 30 and through the openings 31 back to the body of liquid L in the lower portion of housing 11.

In the illustrated embodiment, the dipstick tube 14 is inclined to the vertical so that such liquid is caused to flow along the lower side of the tube below the lower end of the baffle tube in returning to the liquid body L. As will be obvious to those skilled in the art, the baffle tube may be arranged to extend fully downwardly to below the upper level of the liquid if desired.

The spacer means 28 is reversely identical to the spacer means 29 and, thus, defines a plurality of openings 32 similar to openings 31. Openings 32 provide communication between the vent passage 22 and the open upper end 23 of the dipstick tube 14 so as to provide for the desired breather action discussed above. The upper end of the baffle tube is disposed above the level of the vent opening so as to effectively preclude impingement of the liquid passing through opening 22 onto the upper end of the dipstick.

The baffle tube 26 may be positioned within the dipstick tube by means of an annular shoulder (33) formed in the dipstick tube adjacent the upper level of the liquid body L. Spacer means 29 may project into abutment with the shoulder 33 to limit the downward movement of the baffle tube to the position shown in FIG. 2, thereby providing an automatic positioning means in the assembly of the device 13. As will be obvious to those skilled in the art, any suitable means may be provided for effecting the desired retention of the baffle 26 in the desired disposition within the dipstick tube.

In the illustrated embodiment, the spacers 28 and 29 are formed integrally from the baffle tube. As will be obvious to those skilled in the art, any suitable spacing means may be provided in association with the baffle tube, as desired, the formed spacing means being illustrative of one novel arrangement only. Similarly, any suitable means may be provided on the dipstick tube 14 for cooperation with the baffle tube in effectively locating the baffle tube therein. Alternatively, the baffle tube may be located within the dipstick tube by suitable apparatus and then fixed in such disposition as by welding, etc.

Industrial Applicability

The invention comprehends that the combined dipstick-breather tube device be useful in all forms of industrial applications wherein sensing of the level of a body of liquid within a container is to be effected with the measurement being accurately made notwithstanding turbulence in the liquid being sensed.

The improved dipstick-breather tube device 13 may be utilized illustratively for determining the level of lubricating oil in a gearbox, such as in the illustrative embodiment 10 of apparatus embodying the invention. Further illustratively, the device 13 may be utilized in determining the level of lubricating oil in a crankcase, such as provided in conventional vehicles, including tractors and the like. The improved level measuring and breather device is extremely simple and economical of construction and, thus, may advantageously be utilized in a wide range of industrial applications.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. A device (13) having means for measuring the level of liquid (L) in a housing (11) notwithstanding turbulence of the liquid therein and defining means for passing gaseous fluids into and from the housing above the level of the liquid therein, said device comprising:
   a tube (14) having a first end portion (15) adapted to be received in the liquid (L), an opposite second end portion (16) adapted to project upwardly through a portion (34) of the housing and having an upper open end (23), and a midportion (17) having an opening (22) therein for passing gaseous fluids;
   a dipstick (18) extending removably longitudinally within said tube (14) and having an end portion (20) outwardly of said tube second end portion for manipulation of the dipstick; and
   a baffle (26) in said tube midportion (17) inwardly of said opening (22) for preventing liquid passed inwardly through said opening such as a result of turbulence in the liquid for impinging against said dipstick thereof, said tube and baffle cooperatively defining a gaseous fluid flow passage between said upper end (23) of the tube and said opening (22).

2. The device of claim 1 wherein said baffle (26) comprises a tubular element extending longitudinally within the tube (14), and means (28,29) for spacing said element inwardly of said opening (22).

3. The device of claim 1 wherein said baffle (26) comprises a tubular element extending longitudinally within the tube (14), and means (28,29) for spacing said element inwardly of said opening (22) comprising spacer elements (28) extending from an upper portion (27) of said tubular element outwardly to said tube (14).

4. The device of claim 1 wherein said baffle (26) comprises a tubular element extending longitudinally within the tube (14), and means (28,29) for spacing said element inwardly of said opening (22) comprising spacer elements (28) extending from an upper portion (27) of said tubular element outwardly to said tube (14) above the level of said opening (22).

5. The device of claim 1 wherein said baffle (26) comprises a tubular element extending coaxially within the tube (14), and means (28,29) for spacing said element inwardly of said opening (22) comprising spacer elements (28) extending from an upper portion (27) of said tubular element outwardly to said tube (14) above the level of said opening (22).

6. The device of claim 1 wherein said baffle (26) comprises a tubular element extending longitudinally within the tube (14), and means (28,29) for spacing said element inwardly of said opening (22) comprising spacer elements (28) extending both from an upper portion (27) and a lower portion (35) of said tubular element outwardly to said tube (14).

7. The device of claim 1 wherein said baffle (26) comprises a tubular element extending longitudinally within the tube (14), and means (28,29) for spacing said element inwardly of said opening (22) comprising means formed integrally in said tubular element and extending outwardly into engagement with said tube (14).

8. A device (13) having means for measuring the level of liquid (L) in a housing (11) notwithstanding turbulence of the liquid therein and defining means for passing gaseous fluids into and from the housing above the level of the liquid therein, said device comprising:

a tube (14) having a first end portion (15) adapted to be received in the liquid (1), an opposite second end portion (16) adapted to project upwardly through a portion (34) of the housing and having an upper open end (23), and a midportion (17) having an opening (22) therein for passing gaseous fluids;

a dipstick (18) extending removably longitudinally within said tube (14) and having an end portion (20) outwardly of said tube second end portion for manipulation of the dipstick;

a baffle (26) in said tube midportion (17) inwardly of said opening (22) for preventing liquid passed inwardly through said opening such as a result of turbulence in the liquid for impinging against said dipstick thereof, said tube and baffle cooperatively defining a gaseous fluid flow passage between said upper end (23) of the tube and said opening (22); and means (33) for limiting downward movement of the baffle with the tube to prevent displacement of said baffle to below said opening.

9. The device of claim 8 wherein said means for limiting downward movement of the tube comprises shoulder means (33) on said tube and cooperating shoulder means (29) on the baffle (26).

10. The device of claim 8 wherein said means for limiting downward movement of the tube comprises shoulder means (33) on said tube and cooperating shoulder means (29) on the baffle (26) defining the lower end (35) of the baffle.

11. The device of claim 8 wherein said means for limiting downward movement of the tube comprises shoulder means (33) on said tube and cooperating shoulder means (29) on the baffle (26) spacing said baffle radially inwardly of said tube (14).

12. The device of claim 8 wherein said baffle (26) comprises a tubular element and said means for limiting downward movement of the tube defines means (29) for coaxially centering the tubular element within said tube.

* * * * *

UNITED STATES PATENT AND TRADEMARK OFFICE
CERTIFICATE OF CORRECTION

PATENT NO. : 4,176,457
DATED : December 4, 1979
INVENTOR(S) : Gary L. Keffeler

It is certified that error appears in the above-identified patent and that said Letters Patent are hereby corrected as shown below:

Column 6, line 18, (Cl. 8) after "baffle" cancel "with" and substitute therefor --within;

line 21 (Cl. 9) after "The" cancel "tube" and substitute therefor --baffle--;

line 26, (Cl. 10) after "the" cancel "tube" and substitute therefor --baffle--;

line 31 (Cl. 11), after "the" cancel "tube" and substitute therefor --baffle--; and line 37 (Cl. 12), after "the" cancel "tube" and substitute therefor --baffle--.

Signed and Sealed this

Third Day of June 1980

[SEAL]

Attest:

SIDNEY A. DIAMOND

*Attesting Officer*   *Commissioner of Patents and Trademarks*